April 27, 1965
D. E. STEER ETAL
3,180,349
TUBELESS TIRE VALVE
Filed Oct. 25, 1961
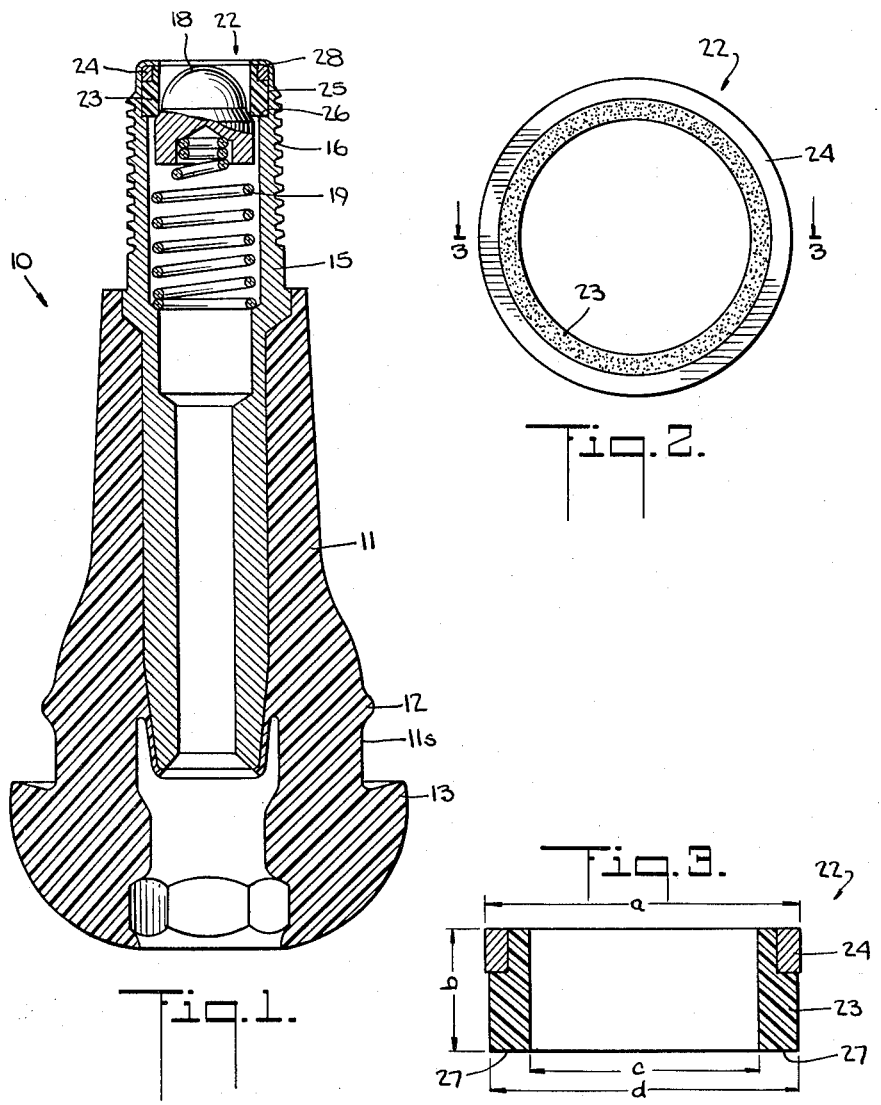
INVENTORS
DONALD E. STEER
JOSEPH W. SMITH
BY
Kenyon & Kenyon
ATTORNEYS

United States Patent Office 3,180,349
Patented Apr. 27, 1965

3,180,349
TUBELESS TIRE VALVE
Donald E. Steer, Stratford, and Joseph W. Smith, Easton, Conn., assignors to Bridgeport Brass Company, Bridgeport, Conn., a corporation of Connecticut
Filed Oct. 25, 1961, Ser. No. 147,536
5 Claims. (Cl. 137—223)

This invention relates to a valve and more particularly to a coreless valve and valve seal for use with tubeless tires.

Prior to this invention, the conventional tire valve had a replaceable core which could be removed and replaced when the seal, between the atmosphere and the air inside the tire, became worn. A replaceable core was necessary for two reasons. First, the valve housing was integral with the inner tube and thus could not be replaced whenever a worn seal required replacement of the seal. In addition, the initial inflation of the tire tube at the factory had to be through the inner tube valve. To save time, it was desirable to have a fairly large port for the purpose of this initial inflation. For this reason, a removable core was desirable. To serve both of the above purposes, the ordinary tire valve with a removable and replaceable core that operated as an atmospheric seal was an effective solution.

With the advent of tubeless tires, neither of the above considerations obtain. First of all, the initial inflation of the tubeless tire is around the rim and not through the valve thereby making it unnecessary to have a large port through the valve to the inside of the tire. Secondly, it became possible to have a plug-in valve that could be plugged into the metal rim of the tubeless tire. This meant that the valve housing no longer had to be integral with the tire.

Accordingly, it becomes possible to simplify the design and reduce the cost of tire valves by eliminating the replaceable core aspect and thereby shift from a two-part design to a unitary design. However, any change of valve design faces the problem of retaining those dimensions of the standard valve which will permit inflating the tire and gaging the tire pressure with standard service equipment.

The difficulty with retaining the standard air intake button and standard dimensions of the input port while merely adding a permanent seal of some rubber type material between the button and the inner walls of the valve is that the small dimension of the front end of the valve will require a very small sealing element so that the flow of air into the tire will not be restricted. A small rubber insert does not have the rigidity necessary to hold its shape and effect a useful seal. A sealing insert large enough to hold its shape and effect a useful seal would interfere with the flow of air into or out of the tire.

Accordingly, it is a major object of this invention to provide a replaceable valve that can be used with standard inflating and gaging service equipment.

It is another object of this invention to provide a simplified unitary valve.

Another object of this invention is to provide an atmospheric seal in a coreless unitary valve.

Other objects of this invention will become clear from the following detailed description and drawings in which:

FIG. 1 is a cross-section view of a unitary valve incorporating this invention.

FIG. 2 is an axial cross-section of the atmospheric seal used in the valve of FIG. 1, and FIG. 3 is a cross-section of the seal shown in FIG. 2 along the lines 3—3.

FIG. 1 illustrates a plug-in tire valve 10 made in accordance with the teachings of this invention. The housing portion 11 is a rubberized material which has an outer configuration that permits snapping it into a hole in the metal rim of a tubeless tire. All the elements of the valve 10 are essentially circular in cross section. The metal rim of the tire has a hole and when the valve 10 is snapped into place the annular surface 11s forms a seal with the annular hole surface. The annular protrusions 12 and 13 in the body 11 define the width of the sealing surface 11s and serve to hold the valve 10 in place after the valve has been snapped into the tire rim.

A metal body 15 is coaxial with the rubber housing 11 and, in the main, is inside the housing 11. The metal body 15 has a threaded cap end 16 which protrudes from the housing 11. It is important that the outer dimensions of the cap end 16 be the same as the outer dimensions of the cap end of a standard tire valve. The maintenance of such dimensions in the cap end 16 permits use of standard gaging and inflating equipment with the valve 10. The cap end 16 is threaded to receive a standard valve cap (not shown) as a secondary protective seal.

A standard size button 18 is held in the outboard position by a spring 19 until inward pressure is exerted on the button 18 by gaging or inflating equipment. It is important that the button 18 be standard size for the same reasons that the outside dimensions of the cap end 16 must be standard size, to permit use of standard gaging and inflating equipment.

There is extremely little space left between the button 18 and the inner walls of the cap end 16 to effect the seal that is necessary so that air will not escape from the tire when the button 18 is in the outboard position, which is its usual position. With a replaceable core, such a seal is not needed at this location. Thus the key to being able to dispense with the removable core is the design of the seal 22. FIGURES 2 and 3 show the seal 22 more clearly than is possible in FIG. 1.

The seal 22 itself is composed of a rubber-like ring 23 reinforced by a metallic ring 24. A number of rubber-like materials may be suitable for this purpose. However, a neoprene material having a durometer hardness between 55 and 60 has been found satisfactory and preferable in the illustrated embodiment. The seal 22 has very small dimensions. The following dimensions are given for the embodiment illustrated since it is the small size of the seal which requires the particular structure of this invention. The dimensions indicated by the letters $a$, $b$, $c$, and $d$ in FIG. 3 are:

$a$—0.243 to 0.246 in.
$b$—0.093 in.
$c$—0.180 in.
$d$—0.237 in.

As may best be seen in FIG. 1, the actual sealing mechanism is the seal 22 set into a recess 25 in the inner wall of the cap end 16. The recess 25 provides a frontwardly fusing wall 26 which abuts the rear surface 27 of the seal 22. A tab 28 which is integral with the metal body 15 is tucked over to contact the metal ring 24. The seal 22 is thus held in place against forward and rearward movement by the combined effect of the recess wall 26 and the tab 28.

The metal ring 24 has two related functions. The first is to supply rigidity to the seal 22 so that the seal 22 will not buckle. The second is to provide a place on the seal 22 where the flap 28 can exert a force to hold the seal 22 in place. If the entire seal 22 were made of rubber, so small a flap 28 would not hold back the seal 22 even if the seal did not buckle but rather would merely dig into the seal 22 as the seal 22 was pushed outwards under the force of the spring 19. Thus it is the use of the metal ring 24 located in the front outer corner of the seal 22 that makes possible a coreless tire valve which has dimensions that permit its use in conjunction with standard gaging and inflating equipment.

For the purpose of this application, and in particular in the claims, the terms "outer" and "inner" shall refer to distances as measured from the valve axis; while the terms "front" and "rear" shall refer to distances and locations along the valve axis with the cap end 22 being considered the front end. Thus, it would be consistent with these definitions to state that the seal 22 is in front of the spring 19 and that the metal reinforcing ring 24 is at the front, outer corner of the seal 22.

The above described seal 22 permits the design of a coreless replaceable valve which may be used with standard gaging and inflating equipment. It permits an adaptation of the cap end of a valve without requiring significant dimensional changes in the cap end.

While one embodiment has been described in detail, it is to be understood that the present disclosure is by way of example and that changes in the details of construction will be apparent to one skilled in the art. The claims are intended, therefore, to cover all such modifications as fall within the true scope of the invention.

What is claimed is:

1. A tubeless tire valve comprising an outer elongated elastomer body adapted for positioning in a rim hole, a metallic tubular stem member coaxially disposed in said body and having an end portion extending from one end of said body and adapted for interconnection with standard inflating and gaging equipment, said end portion having an inner cylindrical recessed portion therein facing outwardly therefrom, the side wall of said recessed stem end portion being of substantially reduced thickness relative to the rest of said stem, sealing means disposed within said recessed portion, plug means disposed within said tubular member and movable against said sealing means in sealing relationship therewith, spring means within said tubular member for urging said plug means into said sealing relationship, the outer end of said tubular stem member being formed radially inwardly over said sealing ring member.

2. A tubeless tire valve comprising an outer elongated elastomer body adapted for positioning in a rim hole, a metallic tubular member coaxially disposed in said body and having an end portion extending from one end of said body and adapted for interconnection with standard inflating and gaging equipment, said end portion having an inner cylindrical recessed portion therein facing outwardly therefrom, the side wall of said recessed stem end portion being of substantially reduced thickness relative to the rest of said stem, a complementary shaped sealing ring member disposed in said recessed portion, plug means disposed within said tubular member and movable against said sealing ring member in sealing relationship therewith, spring means within said tubular member for urging said plug means into said sealing relationship, the outer end of said tubular member being formed radially inwardly over said sealing ring member and being coterminous with the top of said sealing ring member.

3. A tubeless tire valve comprising an outer elongated elastomer body adapted for positioning in a rim hole, a metallic tubular member coaxially disposed in said body and having an end portion extending from one end of said body and adapted for interconnection with standard inflating and gaging equipment, said end portion having an inner cylindrical recessed portion therein facing outwardly therefrom, the side wall of said recessed stem end portion being of substantially reduced thickness relative to the rest of said stem, a complementary shaped sealing ring member disposed in said recessed portion having an elastomeric body portion and a metallic reinforcing ring recessed into the periphery of the outer end of said sealing ring member, plug means disposed within said tubular member and movable against the inner end of said sealing ring member in sealing relationship therewith, spring means within said tubular member for urging said plug means into said sealing relationship, the outer end of said tubular member being formed radially inwardly over said sealing ring member and being coterminous with the top of said sealing ring member.

4. A tubeless tire valve comprising an outer elongated elastomer body adapted for positioning in a rim hole, a metallic tubular member coaxially disposed in said body and having an end portion extending from one end of said body and adapted for interconnection with standard inflating and gaging equipment, said end portion having an inner cylindrical recessed portion therein facing outwardly therefrom, the side wall of said recessed stem end portion being of substantially reduced thickness relative to the rest of said stem, a complementary shaped sealing ring member disposed in said recessed portion having a neoprene body portion and a metallic reinforcing ring recessed into the periphery of the outer end of said sealing ring member, a valve button disposed within said tubular member and movable against the inner end of said sealing ring member in sealing relationship therewith, spring means within said tubular member for urging said valve button into said sealing relationship, the outer end of said tubular member being formed radially inwardly over said sealing ring member into contact with said reinforcing ring to maintain said ring member in said recessed portion, the overlapping portion of said outer end being coterminous with the top of said ring member.

5. A tubeless tire valve comprising an outer elongated elastomer body adapted for positioning in a rim hole, a metallic tubular member coaxially disposed in said body and having an end portion extending from one end of said body and adapted for interconnection with standard inflating and gaging equipment, said end portion having an inner cylindrical recessed portion therein facing outwardly therefrom, the wide wall of said recessed stem end portion being of substantially reduced thickness relative to the rest of said stem, a complementary shaped sealing ring member disposed in said recessed portion having a neoprene body portion with a Shore Durometer hardness of from about 55 to about 60 and a metallic reinforcing ring recessed into the periphery of the outer end of said sealing ring member, a valve button disposed within said tubular member and movable against the inner end of said sealing ring member in sealing relationship therewith, spring means within said tubular member for urging said valve button into said sealing relationship, the outer end of said tubular member being formed radially inwardly over said sealing ring member into contact with said reinforcing ring to maintain said ring member in said recessed portion, the overlapping portion of said outer end being coterminous with the top of said ring member.

References Cited by the Examiner

UNITED STATES PATENTS

| 1,114,937 | 10/14 | Tessner | 137—223 |
| 2,248,489 | 7/41 | Broecker | 152—430 |
| 2,254,000 | 8/41 | Broecker | 152—430 |
| 2,325,685 | 8/43 | Keefe | 137—223 |
| 2,832,562 | 4/58 | Myers | 251—368 X |
| 2,934,315 | 4/60 | Kenann | 251—362 |

FOREIGN PATENTS 136   1/97   Great Britain.

ISADOR WEIL, *Primary Examiner.*

MARTIN P. SCHWADRON, *Examiner.*